US011066981B2

(12) United States Patent
Rossignol et al.

(10) Patent No.: US 11,066,981 B2
(45) Date of Patent: Jul. 20, 2021

(54) AIR DISTRIBUTOR AND VEHICLE COMPRISING THIS AIR DISTRIBUTOR

(71) Applicant: NOVARES FRANCE, Clamart (FR)

(72) Inventors: Vincent Rossignol, Lyons (FR); Gilles Waymel, Hulluch (FR); Jérôme Demangeot, Calonne sur la Lys (FR)

(73) Assignee: NOVARES FRANCE, Clamart (FR)

( * ) Notice: Subject to any disclaimer, the term of this patent is extended or adjusted under 35 U.S.C. 154(b) by 102 days.

(21) Appl. No.: 16/304,973

(22) PCT Filed: May 22, 2017

(86) PCT No.: PCT/FR2017/051242
§ 371 (c)(1),
(2) Date: Nov. 27, 2018

(87) PCT Pub. No.: WO2017/203143
PCT Pub. Date: Nov. 30, 2017

(65) Prior Publication Data
US 2019/0162111 A1    May 30, 2019

(30) Foreign Application Priority Data

May 27, 2016    (FR) .................................... 16/54784

(51) Int. Cl.
*F02B 29/04*    (2006.01)
*F02M 35/10*    (2006.01)
(Continued)

(52) U.S. Cl.
CPC ...... *F02B 29/0462* (2013.01); *F02B 29/0475* (2013.01); *F02M 35/104* (2013.01);
(Continued)

(58) Field of Classification Search
CPC ............ F02B 29/0462; F02B 29/0475; F02M 35/10026; F02M 35/10052;
(Continued)

(56) References Cited

U.S. PATENT DOCUMENTS 4,474,162 A    10/1984  Mason
8,739,857 B2    6/2014  Garrett et al.
(Continued)

FOREIGN PATENT DOCUMENTS

CN    1276515    12/2000
CN    102852678    1/2013
(Continued)

OTHER PUBLICATIONS

English Machine Translation to Abstract of DE102008057420.
(Continued)

*Primary Examiner* — Mahmoud Gimie
(74) *Attorney, Agent, or Firm* — Cantor Colburn LLP

(57) ABSTRACT

This air distributor (1) has an exterior casing defining an interior volume, an air inlet (4) opening into this interior volume, several air outlets (4) intended to convey air from the interior volume towards the cylinders of an engine, and a heat exchanger (8) arranged in the interior volume. The heat exchanger (8) comprises a stack of plates (10) of plastic material where adjacent plates (10) are arranged so as to define a set of intermediate spaces comprising closed intermediate spaces (12) in fluid communication to enable circulation of fluid through the stack of plates (10), and open intermediate spaces (14) configured to enable a passage of air through the stack of plates (10) from the air inlet (4) to the air outlets (6).

17 Claims, 3 Drawing Sheets

(51) Int. Cl.
*F02M 35/104* (2006.01)
*F28F 21/02* (2006.01)
*F28F 21/06* (2006.01)
*F28D 1/03* (2006.01)
*F28D 9/00* (2006.01)
*F28D 21/00* (2006.01)

(52) U.S. Cl.
CPC ........ *F02M 35/10026* (2013.01); *F02M 35/10052* (2013.01); *F02M 35/10262* (2013.01); *F02M 35/10268* (2013.01); *F02M 35/10321* (2013.01); *F28D 1/0325* (2013.01); *F28D 1/0341* (2013.01); *F28D 9/0043* (2013.01); *F28D 9/0056* (2013.01); *F28F 21/02* (2013.01); *F28F 21/065* (2013.01); *F28D 2021/0082* (2013.01); *Y02T 10/12* (2013.01)

(58) Field of Classification Search
CPC ....... F02M 35/10262; F02M 35/10268; F02M 35/10321; F02M 35/104; F28D 1/0325; F28D 1/0341; F28D 9/0043; F28D 9/0056; F28D 2021/0082; F28F 21/02; F28F 21/065
USPC .................................................... 123/184.21
See application file for complete search history.

(56) References Cited

U.S. PATENT DOCUMENTS

| | | | | |
|---|---|---|---|---|
| 9,038,610 B2* | 5/2015 | Meshenky | ........... | F02M 35/112 |
| | | | | 123/184.21 |
| 9,328,968 B2 | 5/2016 | Vanderwees | | |
| 2008/0003074 A1 | 1/2008 | Schlotter | | |
| 2008/0173436 A1 | 7/2008 | Baylis et al. | | |
| 2011/0168365 A1* | 7/2011 | Garret | ................ | F02B 29/0462 |
| | | | | 165/148 |
| 2015/0129183 A1* | 5/2015 | Peskos | ................ | F02B 29/0462 |
| | | | | 165/166 |
| 2015/0241143 A1* | 8/2015 | Da Silva | ................... | F28F 9/12 |
| | | | | 165/166 |
| 2016/0025418 A1 | 1/2016 | Devedeux et al. | | |
| 2016/0097596 A1* | 4/2016 | Stewart | ................. | F28D 1/0233 |
| | | | | 165/175 |
| 2016/0245597 A1* | 8/2016 | Meshenky | .............. | F28F 9/001 |
| 2018/0252128 A1* | 9/2018 | Rossignol | ............. | B29C 66/114 |
| 2019/0041137 A1* | 2/2019 | Stewart | ................... | F28F 9/001 |
| 2019/0049195 A1* | 2/2019 | Meshenky | ............ | F28D 1/0341 |

FOREIGN PATENT DOCUMENTS

| | | |
|---|---|---|
| CN | 103988043 | 8/2014 |
| CN | 104713392 | 6/2015 |
| CN | 105308408 | 2/2016 |
| DE | 102008057420 A1 | 12/2009 |
| EP | 2243938 A1 | 10/2010 |
| EP | 2508832 A | 10/2012 |
| FR | 2989768 A1 | 10/2013 |
| WO | 2008003074 A2 | 1/2008 |
| WO | 2014065318 A1 | 5/2014 |

OTHER PUBLICATIONS

English Machine Translation to Abstract of EP2243938.
English Machine Translation to Abstract of EP2508832.
English Machine Translation to Abstract of FR2989768.
English Machine Translation to Abstract of WO2014065318.
International Search Report for Application No. PCT/FR2017/051242.
CN First Search for Application No. 2017800324977.
CN Office Action for Application No. 201780032497.7.
English Translation CN Office Action for Application No. 201780032497.7.

* cited by examiner

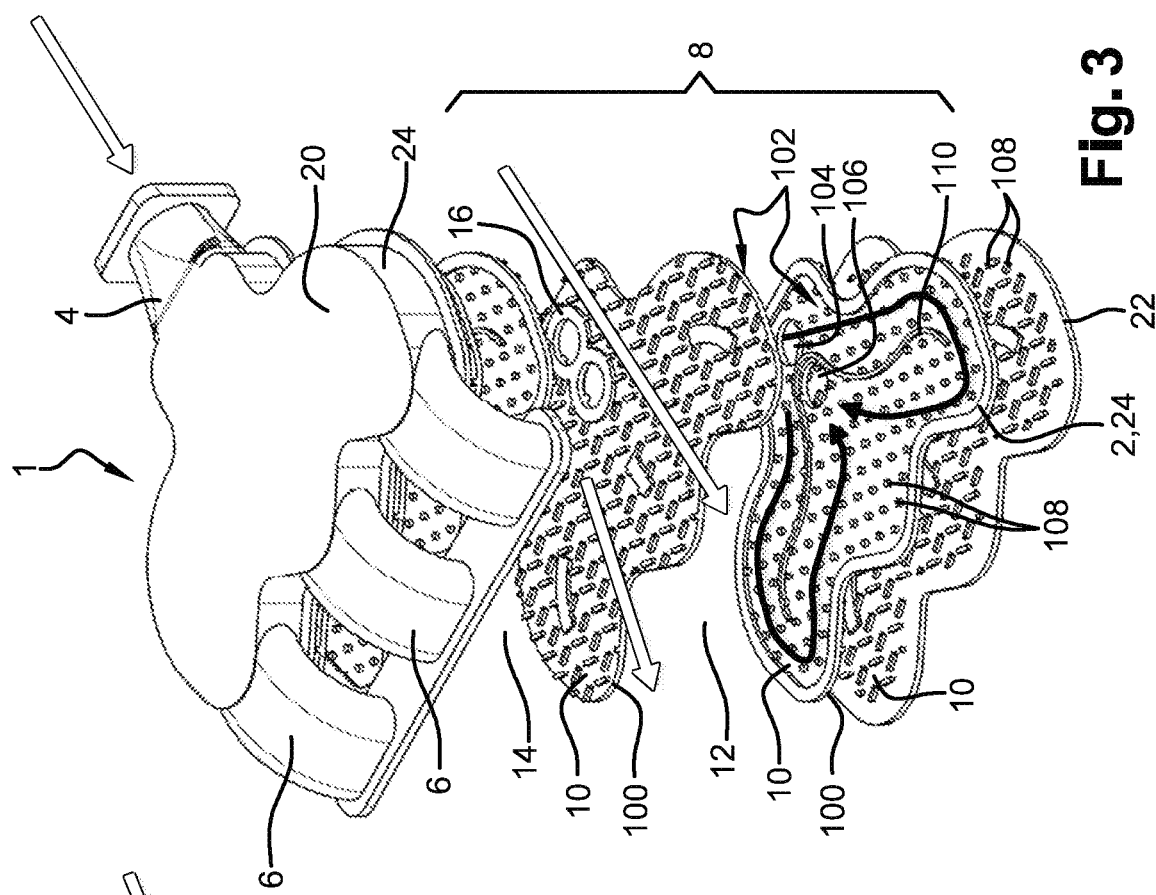
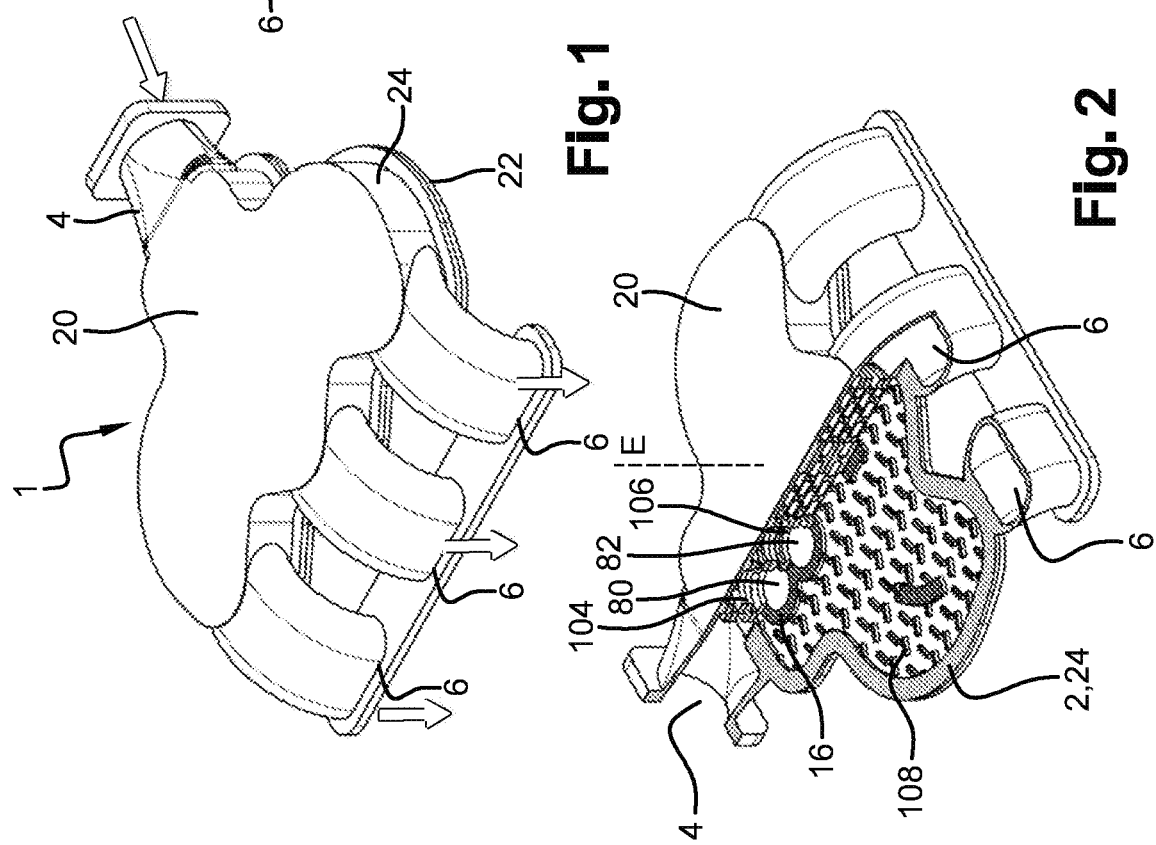

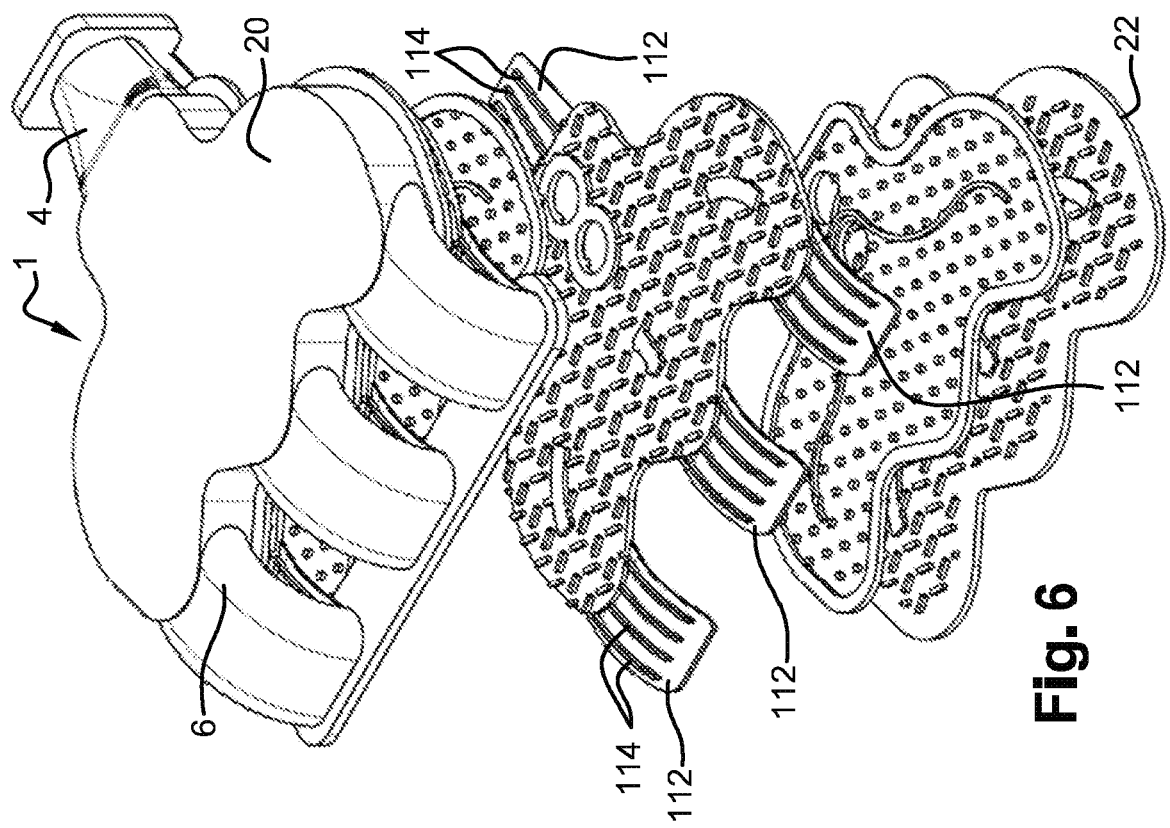
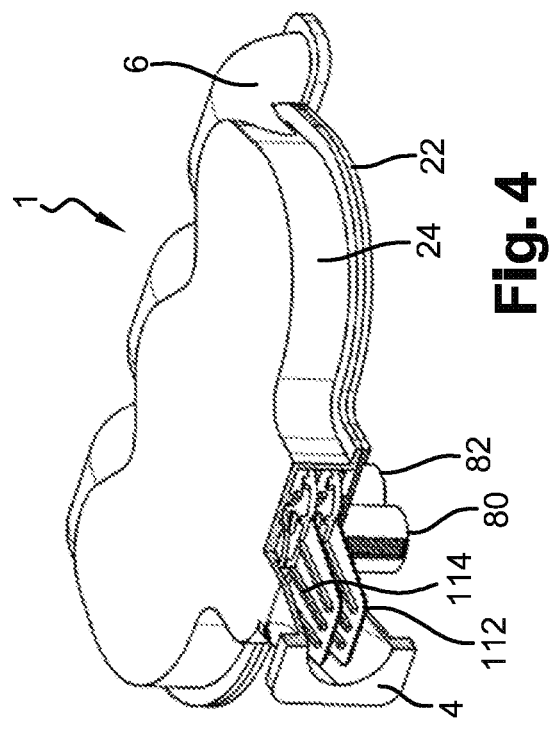
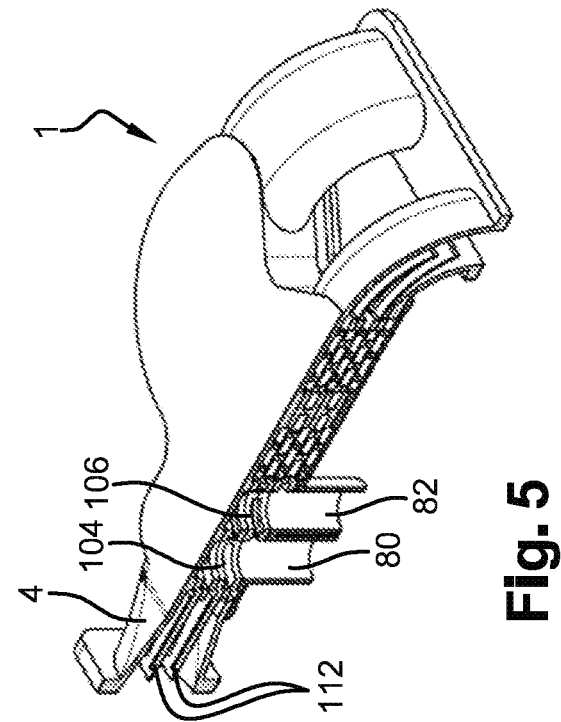

AIR DISTRIBUTOR AND VEHICLE COMPRISING THIS AIR DISTRIBUTOR

CROSS REFERENCE TO RELATED APPLICATIONS

This application is a National Stage of PCT Application No. PCT/FR2017/051242 filed on May 22, 2017, which claims priority to French Patent Application No. 16/54784 filed on May 27, 2016, the contents each of which are incorporated herein by reference thereto.

TECHNICAL FIELD

The present invention concerns an air distributor, and a vehicle comprising this air distributor.

BACKGROUND

Conventionally, an air distributor, also called intake manifold, comprises an air inlet and several air outlets intended to be connected to a cylinder head of an engine to convey to each cylinder of the engine the air required for the combustion of fuel.

It is known to position a heat exchanger inside the distributor to perform a heat exchange between the air circulating through the distributor in the direction of the engine and one or several fluid(s) circulating through the heat exchanger.

However, the heat exchanger and the distributor are parts independent of each other.

In addition, the heat exchangers, made of aluminum, are conventionally of a parallelepiped shape. This is not necessarily the case of the distributor within which the heat exchanger is positioned.

A first disadvantage is a by-pass phenomenon: part of the air circulating in the distributor does not pass through the heat exchanger, but circulates at the clearance(s) existing between the heat exchanger and the skin of the distributor. This results in a lower heat exchange efficiency. In addition, the temperature at the outlet of the distributor is not homogeneous.

Another disadvantage is that the robustness of the set formed of the distributor and of the heat exchanger is limited. To overcome this disadvantage, it is then necessary to provide bridges ensuring the rigidity of this set. Nevertheless, the bridges reduce the heat exchange surface and consequently the efficiency of the heat exchange. Moreover, the bridges are additional independent parts which are added to the air distributor. This constitutes a constraint in terms of manufacture and due to the existing clearances, and constitutes a source of noise due to the vibrations during operation.

BRIEF SUMMARY

Also, the present invention aims at overcoming all or part of these disadvantages by proposing an air distributor including a heat exchanger with improved efficiency.

To this end, the present invention relates to an air distributor having an outer enclosure delimiting an interior volume, an air inlet opening into this interior volume, and several air outlets intended to conduct air from the interior volume to the cylinders of an engine, wherein the air distributor comprises a heat exchanger arranged in the interior volume, the heat exchanger comprising a stack of plates made of plastic material, where the adjacent plates of the stack of plates are arranged so as to delimit a set of intermediate spaces, the set of intermediate spaces comprising closed intermediate spaces that are fluidically connected together to allow a circulation of fluid through the stack of plates, and open intermediate spaces that are configured to allow an air passage through the stack of plates from the air inlet to the air outlets of the distributor.

Thus, the distributor according to the invention incorporates a heat exchanger which occupies in an optimized manner almost all the interior volume delimited by the outer enclosure of the distributor, so that the heat exchange interface is optimal (the heat exchange surface is larger at equivalent volume) and the air leakage (by-pass effect) is limited by the fact that the plates, made of plastic material, can actually conform to the shape of the outer enclosure, thus offering a more homogeneous temperature at the outlet of the distributor. Moreover, the heat exchanger and the distributor are formed in one piece, which improves the robustness of the distributor-heat exchanger set without prejudice to the heat exchange efficiency, and which also contributes to reducing the generated noise.

According to one preferred embodiment, plates of the stack of plates have an edge secured to the outer enclosure of the distributor.

This characteristic has the advantage of further limiting the by-pass effects while improving the robustness of the distributor.

According to one preferred embodiment, the edge of the plates is continuously bonded to the outer enclosure of the distributor.

Thus, the by-pass effects are almost eliminated, so that the heat exchange efficiency is substantially improved.

According to one preferred embodiment, the outer enclosure of the distributor has a side wall, and the contour of the plates is similar to the contour delimited by the side wall.

Thus, the plates conform to the shape of the distributor, so that the heat exchange interface is increased, which improves the efficiency of the heat exchange.

According to one preferred embodiment, the contour of the plates and of the side wall extends at least partly in a curvilinear manner.

This allows to limit the dead areas within the open intermediate spaces, that is to say areas where a small amount of air passes. Thus, the efficiency of the heat exchange is improved.

According to one preferred embodiment, the heat exchanger comprises a fluid intake aperture and a fluid discharge aperture each opening into one of the closed intermediate spaces in order to allow entry and exit of the fluid between the outside of the distributor and the closed intermediate spaces of the stack of plates, and these intake and discharge apertures are formed through the outer enclosure of the distributor.

Thus, unlike the distributors of the state of the art where the apertures formed through the outer enclosure of the distributor do not open directly in the heat exchanger but simply allow the passage of a duct leading to the intake and discharge apertures of the heat exchanger, which requires the provision of sealing means between this duct and the outer enclosure of the distributor, the distributor according to the invention is free of such sealing means. The fact that the apertures formed through the outer enclosure of the distributor open directly within the heat exchanger allows increasing the heat exchange interface, avoiding a by-pass effect, and consequently improving the efficiency of the heat exchange.

According to one preferred embodiment, the heat exchanger comprises a fluid intake and discharge channel in order to allow the circulation of a fluid through the closed intermediate spaces of the stack of plates, these intake and discharge channels being arranged opposite the air inlet of the distributor so as to divide the air flow entering the open intermediate spaces.

This characteristic allows dividing the air flow entering the distributor in order to circulate it through all the open intermediate space, that is to say to distribute the air flow in order to circulate it over the entire surface of the plates, which corresponds to the heat exchange surface, without dead area. This improves the efficiency of the heat exchange.

According to one preferred embodiment, the outer enclosure has a wall which is opposite a face of one of the plates of the heat exchanger and which delimits therewith an open or closed intermediate space.

Thus, all the interior volume of the exchanger is devoted to the heat exchange, for the purpose of improving the efficiency of this heat exchange.

Advantageously, this intermediate space is a closed intermediate space.

Thus, there is no air flow circulating between the outer enclosure of the distributor and the heat exchanger. All the air passing through the distributor exchanges heat both from above and below, that is to say with a fluid circulating in a closed intermediate space of the heat exchanger. The efficiency of the heat exchange is thereby improved.

According to one preferred embodiment, plates of the stack of plates extend at least partly in a duct delimiting the air inlet and/or in one or more duct(s) delimiting the air outlets.

This allows increasing the heat exchange surface, therefore the heat exchange efficiency. In addition, part the heat exchange takes place in the air outlet ducts, which contributes to guaranteeing a temperature homogeneity at the outlet of the distributor.

According to one preferred embodiment, these plates have tabs extending from the edge of these plates to the duct delimiting the air inlet and/or one or more ducts delimiting the air outlets, the tabs comprising walls or ribs longitudinally extending along the axis of this or these duct(s).

Thus, the air flow is distributed more homogeneously through the open intermediate spaces, for better heat exchange, and straightened at the outlet of the distributor for better stability and filling of the engine.

According to one preferred embodiment, several plates of the stack of plates have a different geometry.

In other words, the plates of the stack of plates are not all identical. This characteristic advantageously allows to create a predetermined thermal gradient within the stack of plates, promoting heat transfer among one or more group(s) of plates, that is to say at one or more predetermined location(s) of the stack of plates.

Particularly, plates of the stack of plates may have a thickness different from that of other plates.

It is also possible to provide plates having obstacle arrangements or surface densities of different obstacles, these obstacles being intended to impede a flowing of fluid.

Always with the aim of creating a thermal gradient within the stack of plates, some of these plates may have, in addition or alternatively to a different geometry, a different density, in particular in terms of thermally conductive filler density different from that of other plates.

According to one preferred embodiment, the outer enclosure of the distributor is made of plastic material.

This allows improving the manufacturing costs of the distributor.

According to one preferred embodiment, the outer enclosure of the distributor is made of a material distinct from that of the plates of the stack of plates.

This allows selecting a high-performance material in terms of heat exchange for the plates and a high-performance material in terms of mechanical strength (resistance to pressure, etc.) for the outer enclosure of the distributor covering the plates.

Preferably, the closed intermediate spaces and the open intermediate spaces are alternately disposed.

This arrangement improves the efficiency of the heat exchange.

According to another aspect, the invention also relates to a vehicle comprising a distributor having the aforementioned characteristics.

This vehicle has the advantage of offering an air distributor including a heat exchanger having improved efficiency.

BRIEF DESCRIPTION OF THE DRAWINGS

Other characteristics and advantages of the present invention will become apparent from the following detailed description of one embodiment, given by way of a non-limiting example, with reference to the appended drawings in which:

FIG. 1 is a perspective view of a distributor according to one embodiment of the invention, FIG. 2 is a partial and perspective sectional view of a portion of a distributor according to one embodiment of the invention, FIG. 3 is a perspective exploded view of a distributor according to one embodiment of the invention, FIG. 4 is a perspective and partial sectional view of a distributor according to one embodiment of the invention, FIG. 5 is a perspective sectional view of a distributor according to one embodiment of the invention, FIG. 6 is a perspective exploded view of a distributor according to one embodiment of the invention.

DETAILED DESCRIPTION

Figure 7:
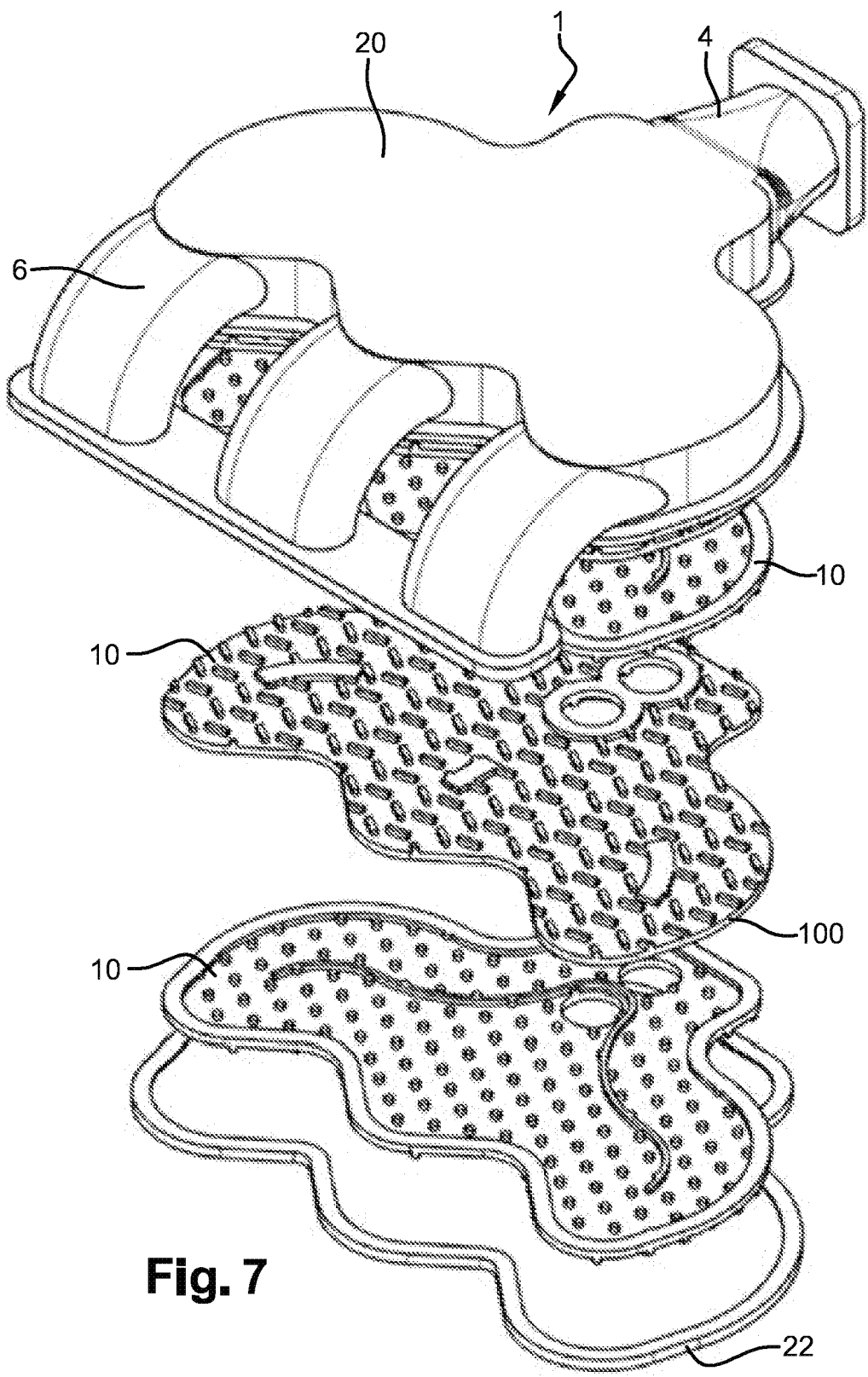
FIG. 7 is a perspective exploded view of a distributor according to one embodiment of the invention.

FIG. 1 shows an air distributor 1 according to one embodiment of the invention. The air distributor 1 is intended to collect and distribute air to each cylinder of an engine for the combustion of fuel.

The distributor 1 has an outer enclosure delimiting an interior volume. The outer enclosure has, for example, an upper wall 20, a lower wall 22 and a side wall 24 linking the upper wall 20 and the lower wall 22. The distributor 1 also comprises an air inlet 4 opening into the interior volume and several air outlets 6 each intended to be connected to one of the cylinders of an engine in order to conduct a fraction of the air entered through the inlet 4 to this cylinder.

The air distributor 1 comprises a heat exchanger 8 which is arranged at least partly inside the volume delimited by the outer enclosure. The exchanger 8 is advantageously integrally contained within the distributor 1, more precisely in the interior volume delimited by the outer enclosure.

The heat exchanger 8 comprises a stack of plates 10. The plates 10 are stacked in a predetermined stacking direction E, in particular perpendicular to the plates 10, which are for example planar.

The adjacent plates of the stack of plates 10 are spaced apart in the stacking direction E so as to delimit, between the adjacent plates 10, a set of intermediate spaces intended for a fluid circulation between the plates 10, so as to allow a heat exchange between these fluids from an intermediate space to another through the plates 10.

The plates 10 may be of the same shape and the same dimensions, so that once stacked, the edges of the plates 10 coincide.

The set of intermediate spaces comprises closed intermediate spaces 12 and open intermediate spaces 14. The closed intermediate spaces 12 are fluidically connected to each other in order to allow a circulation of fluid through these closed intermediate spaces 12 and consequently, through the stack of plates 10. The open intermediate spaces 14 open, on one side, into the inlet 4 and, on the other side, into the air outlets 6 in order to allow a passage of air through the stack of plates 10, from the inlet 4 to the outlets 6.

Preferably, the stack of plates 10 comprises, in the stacking direction E, alternating open and closed intermediate spaces 12, 14.

The plates 10 are configured to allow heat exchange therethrough, that is to say from an intermediate space to an adjacent intermediate space.

The plates 10 are made of plastic material, in particular of plastic material containing a thermally conductive filler, such as for example of polyamide 66 (PA66) including a graphite and/or carbon filler, in order to provide a thermal conductivity at 20° C. greater than 0.6 $W \cdot m^{-1} \cdot K^{-1}$, preferably equal to or greater than 1 $W \cdot m^{-1} \cdot K^{-1}$.

The outer enclosure of the distributor 1, if appropriate the conduits delimiting the inlet 4 and the outlets 6, are also preferentially made of plastic material. It can be of the same plastic as that of the plates 10, or of a distinct plastic material.

Plates 10 of the stack of plates 10 advantageously have an edge 100 secured to the outer enclosure of the distributor 1, in particular the side wall 24. More precisely, the edge 100 of the plates 10 is in contact with the outer enclosure, bonded thereto, for example by welding or gluing. In order to limit as much as possible any bypass effect, the majority of the plates 10, preferably all the plates 10 have an edge 100 secured to the outer enclosure, except optionally one or two end plates 10 of the heat exchanger 8.

To limit as much as possible any by-pass risk o, the edge 100 of the plates 10 is preferably bonded without discontinuity to the outer enclosure of the distributor 1, over the whole section of the outer enclosure with which the edge 100 is in contact. The entire periphery of the plates 10 can thus be linked to this outer enclosure, that is to say all the edges 100, except when appropriate, the section of the edge 100 opposite the air inlet 4 and outlets 6 of the distributor 1.

Consequently, the side wall 24 also serves as a side wall for the heat exchanger 8. Thus, the distributor 1 and the exchanger 8 have the same side wall. This common side wall 24 therefore contributes to delimit also, with the faces 102 opposite the adjacent plates 10, the intermediate spaces. The heat exchanger 8 thus conforms to the shape of the distributor 1, in this case a non-parallelepiped shape, thereby improving the efficiency of the heat exchange.

Particularly, it may be observed that the contour of the plates 10, in particular their edge 100, conforms to the shape of the outer enclosure, in particular of the side wall 24, so that the plates 10 have the same shape and the same dimensions as the side wall 24 section at which these plates 10 extend.

The side wall 24 preferably has a non-rectilinear contour. Thus, the contour of the plates 10 and of the side wall 24 may be curvilinear, which allows limiting the areas with low air circulation within the open intermediate spaces 14.

As illustrated in the figures, it may be observed in particular that the side wall 24, and therefore the plates 10, extends sinuously at the air outlets 6. Thus, the side wall 24 section from which the air outlets 6 extend may have a corrugated shape, here a W-shape, the air outlets 6 extending precisely from the convex portions of this side wall 24 section.

Furthermore, the distributor 1, in particular the side wall 24, has a tapered shape towards the air outlets 6, that is to say expands, preferably in a progressive manner, between the inlet 4 and the outlets 6.

According to an advantageous possibility illustrated in FIGS. 4 to 6, the plates 10 extend at least partly inside the duct delimiting the air inlet 4 and/or one or more of the ducts delimiting the air outlets 6. Thus, the heat exchanger 8 has a larger heat exchange interface.

Particularly, still according to the example of FIGS. 4 to 6, the plates 10 have tabs 112 extending from the section of the edge 100 opposite the inlet 4 and the outlets 6, to the inside of this inlet 4 and these outlets 6.

The tabs 112 are advantageously spaced from each other so as not to disturb the flowing of air into the inlet 4 and the outlets 6. The distributor 1 may for this purpose comprise spacer elements holding the adjacent tabs 112 at a distance from each other.

Alternatively or in a complementary manner, the edge of the tabs 112 may be secured to the inner wall of the ducts delimiting the inlet 4 and the outlets 6.

As can be seen in FIGS. 4 to 6, the tabs 112 may have walls or ribs 114 intended to promote a laminar flowing of the air flow at the inlet as at the outlet of the distributor 1. Thus, the air flow is distributed more homogeneously through the open intermediate spaces, for a better heat exchange, and straightened at the outlet of the distributor 1 for a better stability and filling of the engine.

The ribs 114 extend longitudinally along the axis of the corresponding inlet 4 or outlet 6 duct, for example substantially orthogonal to the section of the edge 100. As shown in FIG. 6, the ribs 114 of the same tab 112 may extend parallel to each other, in particular at the outlets 6, or in a convergent manner away from the edge 100, in particular at the inlet 4.

In the absence of tabs 112, it will be noted that the edges 100 of the plates 10 may be shaped to limit the turbulence and pressure drops at the inlet in the distributor 1. More specifically, the section of the edges 100 opposite the inlet 4 may have a shape, in particular a thinned shape, intended to promote a laminar flowing at the inlet of the distributor 1.

Furthermore, the tabs 112 may be in the same material as the plates 10 to increase the heat exchange surface. The tabs 112 are advantageously made integrally with the plates 10.

As illustrated in particular in FIGS. 2, 4 and 5, the heat exchanger 8 comprises a fluid intake aperture 80 and a fluid discharge aperture 82 each opening into one of the closed intermediate spaces 12 to allow the inlet and the outlet of fluid in the closed intermediate spaces of the stack of plates. These intake and discharge apertures are formed directly through the outer enclosure even of the distributor 1, in particular through the upper wall 20 or the lower wall 22, so that the distributor 1 is free of sealing means at these intake and discharge apertures.

To allow the circulation of a fluid through the closed intermediate spaces 12 of the stack of plates 10, the heat exchanger 8 comprises a fluid intake and discharge channel.

These intake and discharge channels may be formed by a plurality of inlet apertures 104 and outlet apertures 106, these apertures 104, 106 being preferably respectively aligned, particularly along the stacking direction E, and for example formed through the plates 10, each plate 10 having an inlet aperture 104 and an outlet aperture 106.

To allow the passage of a fluid from a closed intermediate space 12 to another through an open intermediate space 14, the heat exchanger 8 may have peripheral walls 16 contributing to form the intake and discharge channels, each peripheral wall 16 extending all around an inlet aperture 104 or an outlet aperture 106, as well as one face 102 to another of the two adjacent plates 10 delimiting the corresponding open intermediate space 14, so as to conduct the fluid to the next intermediate space.

Advantageously, the intake and discharge channels, in particular these peripheral walls 16, are arranged opposite the air inlet 4 of the distributor 1, that is to say near this air inlet 4, on the path of the air flow entering the distributor 1 so as to distribute this air flow as homogeneously as possible within the open intermediate spaces 14.

The plates 10 may moreover have obstacles 108 projecting from their face 102 to disturb the flowing of the air circulating through the open intermediate spaces 14 and of the fluid(s) circulating in the closed intermediate spaces 12.

Each plate 10 may have a geometry and/or density different from that of one or more other plate(s) 10, for example increasing or decreasing in the stacking direction E, so that the stack of plates 10 advantageously has a thermal gradient predetermined through the stack of plates 10. More particularly, the plates 10 may have different thicknesses from each other, and/or obstacle arrangements 108 different in terms of shape, positioning or concentration per surface unit, and/or a density in particular of different thermally conductive fillers.

Within the closed intermediate spaces 12, the plates 10 may have a rib or a wall 110 projecting from their face 102 and extending between the corresponding inlet aperture 104 and outlet aperture 106 in order to maximize the distance traveled by a fluid between this inlet aperture 104 and this outlet aperture 106, so as to better distribute the fluid(s) within the plates 10 and thus homogenize the heat exchange.

As can be seen in FIGS. 3 and 6, the outer enclosure advantageously has a wall, in particular the upper wall 20 and/or the lower wall 22, which is opposite a face 102 of one of the end plates 10 of the heat exchanger 8 and which delimits therewith an intermediate space intended for the circulation of a fluid.

This intermediate space may be an open intermediate space 14 or, preferably, a closed intermediate space 12.

Thus, the entire interior volume of the distributor 1 is occupied by the heat exchanger 8, which improves the efficiency of the heat exchange.

It will be noted that this or these wall(s) 20, 22 may also have obstacles 108 projecting to disrupt the flowing of a fluid and thus improve the efficiency of the heat exchange.

As illustrated in FIG. 7, it is also possible to provide a lower wall 22 distinct from the plates 10 of the heat exchanger 8, delimiting neither one of the closed intermediate spaces nor one of the open intermediate spaces, and in particular free of obstacles 108, this wall 22 not belonging to the heat exchanger 8 being intended to thermally insulate an end plate 10 of the stack of plates 10 from the outside of the distributor 1, to bring more robustness, or to facilitate assembly.

The invention also relates to a vehicle, in particular a motor vehicle, comprising the distributor 1 having all or part of the characteristics described above. The air outlets 6 of the distributor can be linked to a cylinder head of a vehicle engine so as to supply the cylinders of this engine with air required for combustion, while the air inlet 4 can be linked to an air filter or to a compressor of the vehicle.

Of course, the invention is in no way limited to the embodiment described above, this embodiment having been given only as an example. Modifications are possible, in particular from the point of view of the constitution of the various devices or by the substitution of technical equivalents, without departing from the scope of protection of the invention.

The invention claimed is:

1. An air distributor having an outer enclosure delimiting an interior volume, an air inlet opening into this interior volume, and several air outlets intended to conduct air from the interior volume to cylinders of an engine, wherein the air distributor comprises a heat exchanger arranged in the interior volume, the heat exchanger comprising a stack of plates made of plastic material, wherein adjacent plates of the stack of plates are arranged so as to delimit a set of intermediate spaces, the set of intermediate spaces comprising closed intermediate spaces that are fluidically connected together to allow a circulation of fluid through the stack of plates, and open intermediate spaces that are configured to allow an air passage through the stack of plates from the air inlet to the air outlets of the distributor, wherein plates of the stack of plates have an edge secured to the outer enclosure of the distributor and the edge of the plates is continuously bonded to the outer enclosure of the distributor.

2. The air distributor according to claim 1, wherein the outer enclosure of the distributor has a side wall, and a contour of the plates is similar to the contour delimited by the side wall.

3. The air distributor according to claim 2, wherein the contour of the plates and of the side wall extends at least partly in a curvilinear manner.

4. The air distributor according to claim 1, wherein the heat exchanger comprises a fluid intake aperture and a fluid discharge aperture each opening into one of the closed intermediate spaces in order to allow entry and exit of the fluid between the outside of the distributor and the closed intermediate spaces of the stack of plates, and these intake and discharge apertures are formed through the outer enclosure of the distributor.

5. The air distributor according to claim 1, wherein the heat exchanger comprises a fluid intake and discharge channel in order to allow the circulation of a fluid through the closed intermediate spaces of the stack of plates, these intake and discharge channels being arranged opposite the air inlet of the distributor so as to divide air flow entering the open intermediate spaces.

6. The air distributor according to claim 1, wherein the outer enclosure has a wall which is opposite a face of one of the plates of the heat exchanger and which delimits therewith an open or closed intermediate space.

7. The air distributor according to claim 1, wherein plates of the stack of plates extend at least partly in a duct delimiting the air inlet and/or in one or more duct(s) delimiting the air outlets.

8. The air distributor according to claim 7, wherein these plates have tabs extending from the edge of these plates to the duct delimiting the air inlet and/or one or more duct(s) delimiting the air outlets, the tabs comprising walls or ribs longitudinally extending along an axis of this or these duct(s).

9. The air distributor according to claim 1, wherein several plates of the stack of plates have a different geometry.

10. The air distributor according to claim 1, wherein the outer enclosure of the distributor is made of plastic material.

11. The air distributor according to claim 1, wherein the outer enclosure of the distributor is made of a material distinct from that of plates of the stack of plates.

12. A vehicle comprising a distributor according to claim 1.

13. The air distributor according to claim 1, wherein the outer enclosure of the distributor has a side wall and a contour of the plates and of the side wall extends at least partly in a curvilinear manner.

14. The air distributor according to claim 13, wherein the heat exchanger comprises a fluid intake aperture and a fluid discharge aperture each opening into one of the closed intermediate spaces in order to allow entry and exit of the fluid between the outside of the distributor and the closed intermediate spaces of the stack of plates, and these intake and discharge apertures are formed through the outer enclosure of the distributor.

15. The air distributor according to claim 14, wherein the heat exchanger comprises a fluid intake and discharge channel in order to allow the circulation of a fluid through the closed intermediate spaces of the stack of plates, these intake and discharge channels being arranged opposite the air inlet of the distributor so as to divide air flow entering the open intermediate spaces.

16. The air distributor according to claim 15, wherein the outer enclosure has a wall which is opposite a face of one of the plates of the heat exchanger and which delimits therewith an open or closed intermediate space.

17. The air distributor according to claim 16, wherein plates of the stack of plates extend at least partly in a duct delimiting the air inlet and/or in one or more duct(s) delimiting the air outlets.

* * * * *